Aug. 25, 1931.  J. H. McCORMICK ET AL  1,820,671
VENDING MACHINE
Filed Feb. 16, 1929      9 Sheets-Sheet 1

INVENTOR
J. H. McCormack
G. G. Allen
F. M. Bender
BY
Kenyon & Kenyon
ATTORNEYS

Aug. 25, 1931.  J. H. McCORMICK ET AL  1,820,671
VENDING MACHINE
Filed Feb. 16, 1929   9 Sheets-Sheet 6

INVENTOR
J. H. McCormick
C. L. Allen
F. M. Bender
BY
Kenyon & Kenyon
ATTORNEYS

Patented Aug. 25, 1931

1,820,671

UNITED STATES PATENT OFFICE

JOHN H. McCORMICK, CARL G. ALLEN, AND FRANK M. BENDER, OF WILLIAMSPORT, PENNSYLVANIA, ASSIGNORS TO VENDICATER, INC., OF WILLIAMSPORT, PENNSYLVANIA, A CORPORATION OF PENNSYLVANIA

VENDING MACHINE

Application filed February 16, 1929. Serial No. 340,462.

This invention relates to vending machines and pertains more especially to a machine for vending milk or soft drinks either in glass bottles or paper containers.

An object of the invention is a new and improved machine for vending bottle goods or the like preferably in combination with new and improved mechanism for redeeming emptied bottles.

A machine embodying the invention consists essentially of a casing within which is rotatably mounted a frame equipped with a plurality of compartments in which are arranged the goods to be sold. A door is provided in the casing which, when open, permits access to a compartment. Coin releasable locking means are provided for the door and means controlled by the door are provided for advancing the frame to the extent of a single compartment on closing of the door after it has been opened, in connection with the purchase of an article of merchandise. Means are also provided for locking the door before the frame is advanced thereby preventing the utilization of a single coin to obtain access to more than one compartment. In one form of the machine, the frame is provided with a plurality of superposed shelves and the door is of substantially the same height as the frame. Shields are provided for all but the top shelf to prevent access to the compartments of such shelves when the shields are in operative position. Means are provided for moving each shield into its inoperative position when the bottles are exhausted from the shelf next above. Thus whenever the door is open only one compartment containing merchandise is accessible through the door.

In a modified embodiment the machine comprises a casing within which the frame is supported upon a helical track for combined rotation and vertical movement. The frame is equipped with a helical shelf of the same pitch as the track and the shelf is divided into compartments by suitable partitions. A door is provided in the casing which is of substantially the same height and width as one of the compartments and means controlled by the door are provided for advancing the frame to the extent of a single compartment upon the closing of the door after it has been opened in connection with the purchase of an article of merchandise. The second type of machine is designed especially for use in connection with the sale of milk or soft drinks in paper containers whereas the first machine is designed primarily for use in connection with the sale of such drinks in glass bottles.

The first type of machine preferably is provided with mechanism for redeeming empty bottles. This means comprises a carrier for moving the bottles through a chute equipped with a gauge member and feelers. If the bottle presented is of proper size and configuration the feelers are actuated and a coin is delivered to the one who has turned back the bottle. The vending machine is preferably designed to be operated by a dime and the refunding mechanism is designed to pay back to the customer a nickel for the returned bottle. Either form of vending apparatus may be used either separately or in connection with the nickel refunding mechanism but where paper containers are dispensed by the machine there is no need for the refunding mechanism.

Each embodiment is equipped with refrigerating means for keeping cool the merchandise which it contains. The cooling may be accomplished either by the use of ice or by the use of mechanical refrigerating apparatus.

Other objects, novel features and advantages of this invention will be apparent from the following description and accompanying drawings, wherein:

Figs. 18 and 19 are fragmentary sections on the line 18—18 of Fig. 1. Fig. 19—a is a section on the line 19—a—19—a of Fig. 18.

Fig. 20 is a section on the line 20—20 of Fig. 18.

Referring now to Figs. 1 to 23 inclusive, the machine comprises a cylindrical casing 10 which is divided into an upper and a lower chamber by a partition 11, the upper chamber being provided with a removable cover 10a. In the lower chamber there is provided a shelf 11a and a vertical hollow shaft 12 is suitably journalled in the shelf and partition and projects slightly into the upper chamber. At its upper end this shaft 12 carries a circular plate 13 by which is supported an annular frame 14 which is made up of a plurality of superposed shelves 15 divided into compartments 15b by radial partitions 15a. Clips 15c may be provided in the compartments to hold the bottles. Within the frame 14 and supported by the plate 13 is provided a tank 16 to receive ice or within which may be provided any suitable refrigerating apparatus, the tank 16 having an outlet 17 leading to the hollow shaft 12.

Figure 1:
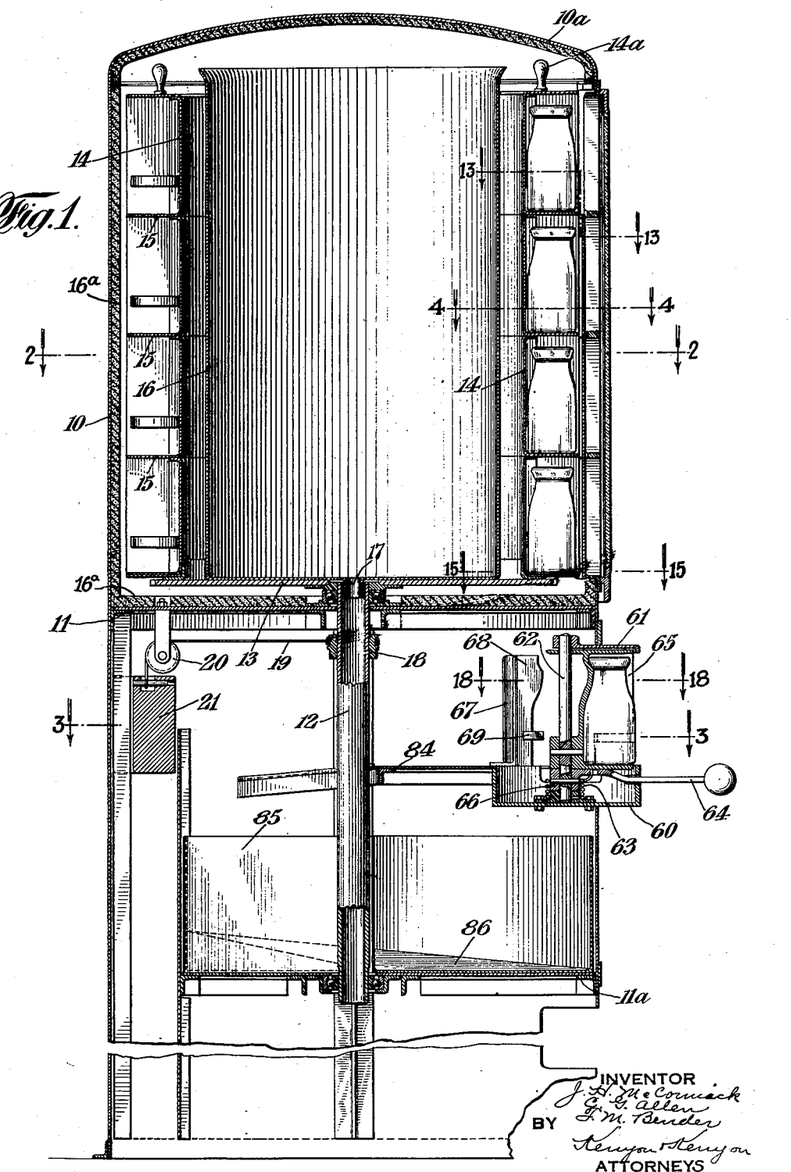
Fig. 1 is a vertical section through a machine embodying the invention.
Figure 2:
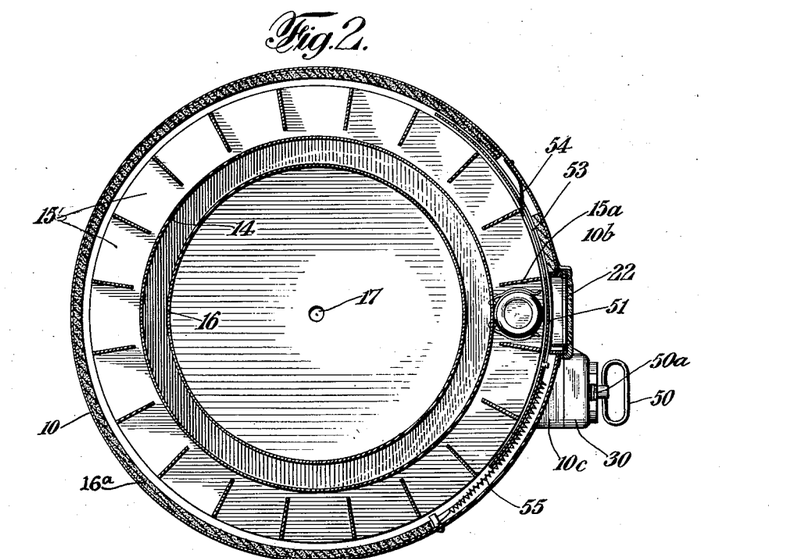
Fig. 2 is a section on the line 2—2 of Fig. 1 with certain structural details omitted.

The shaft 12 is provided with a drum 18 around which is wound a cable 19 which passes over a pulley 20 and is attached to a weight 21. The weight 21 and cable 19 are effective to cause rotation of the plate 13 when released, the plate normally being held against rotation by means subsequently to be described. A lining 16a of heat insulating material is provided for the upper chamber.

An elongated aperture of substantially the same height as the frame 14 is provided in the wall of the upper chamber and a casing 10b is mounted in said aperture and has a portion 10c overlying the wall of the casing laterally of the aperture. A door 22 is hinged to the casing and is provided with an extension 23 (Fig. 5) projecting into the casing 10. Preferably the door 22 is provided with a glass panel 22a through which one vertical row of compartments 15b is visible. The plate 13 is provided on its periphery with uniformly spaced shoulders 24 which are adapted to be engaged by a pawl 25 pivotally supported by the partition 11 and having an arm 25a engaging the extension 23 of the door 22. A spring 26 tends to maintain the pawl 25 in position to engage a shoulder 24 to prevent rotation of the plate 13 under the influence of the weight 21. A detent 27 is pivotally mounted on the partition 11 and is provided with a socket for the purpose of receiving one of the uniformly spaced pins 28 extending from the lower face of the plate 13. A spring 29 maintains the detent 27 in engagement with the extension 23 of the door 22. The shape of the extension 23 is such that when the door 22 is opened the pawl 25 is moved out of engagement with the shoulder 24 and the detent 27 is moved inwardly to receive a pin 28 in its socket, the pin 28 being received in the socket before the pawl 25 is disengaged from the shoulder 24. The socket in the detent 27 is slightly wider than the pin 28, thereby allowing slight movement of the plate 13 after the pawl 25 is disengaged from the shoulder to prevent re-engagement of the pawl with the pin from which it was just disengaged. The arrangement above described constitutes escapement mechanism for advancing the plate 13 and frame 14 step by step upon opening and closing the door 22. The shoulders 24 and the pin 28 are so spaced that each advancement of the plate 13 brings a different vertical row of compartments into register with the door 22. The detent 27 becomes inoperative and releases the table 13 just before complete closing of the door 22. Coin controlled mechanism later to be described is provided for locking the door in closed position. This mechanism is so designed that it becomes operative before the door 22 is closed sufficiently to render the detent 27 inoperative, thereby making it impossible to obtain access to a compartment after the frame has been advanced a step, except by inserting another coin, in the coin controlled mechanism. The door 22 is equipped with a closing spring 22b.

The door 22 is provided with an extension 30, (Figs. 2 and 4) which overlies the part 10c of the casing 10b, the extension 30 being recessed to form a chamber 30a closed by a hinged cover 31, which is locked in closed position by the bolt 31a. The bolt is operable by a key inserted in the tumbler cylinder 31b when the door 22 is open. A hasp 32 is carried by the part 10c of the casing 10b and projects through a slot in the cover 31 into the chamber 30a. A vertical guide 34 (Figs. 8 to 12) is supported by the front wall of the compartment 30a and within the guide is mounted a slide 35 having a longitudinal bore. A locking bolt 36 having an oblique surface 36a is slidably mounted in the bore of the slide 35. A vertical guide 38 is supported by the guide 34 and in it is slidably mounted a second locking bolt 39 having an oblique surface 39a. A pin 37 passes through the locking bolt and slots 35a in the slide and extends through a slot 34a in the guide 34 and also through a slot 38a in the guide 38 into a socket in the locking bolt 39, thus fastening the two bolts together for unitary movement. The two locking bolts are so arranged that both project within the hasp 32 when the door 22 is closed, the upper end of the bolt 36 being in engagement with the cross member of the hasp. A spring 40 exerts upward pressure on the locking bolt 39.

Figures 8, 9:
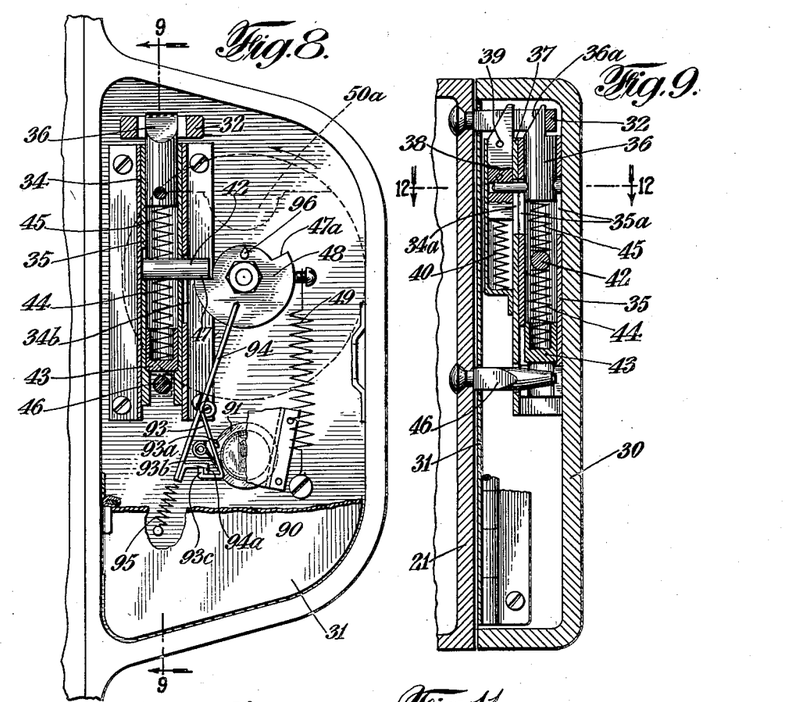
Fig. 8 is a section on the line 8—8 of Fig. 4.
Figs. 9, 10 and 11 are sections taken on the line 9—9 of Fig. 8, showing different positions assumed by the various parts.

A pin 42 is carried by the slide 35 and extends across the bore of the slide and also projects through a slot 34b in the guide 34. In the lower end of the bore of the slide 35 there is slidably mounted a plug 43 and to the pin 42 and the plug 43 are fastened the ends of a spring 44 while to the pin 42 and the bolt 36 are fastened the ends of a spring 45. The lower end of the bore is inwardly flanged to prevent escape of the plug 43 and the lower end of the slide 35 is cut out at 35c for a purpose which will later become apparent. The relationship of the pin 42, locking bolt 36, plug 43 and the springs 44 and 45 is such that when the locking bolt 36 is in its upper or operative position, the plug 43 is held in the bore above the cut-out 35c (Fig. 9). A pin or stud 46 is carried by the part 10c and projects, when the door 22 is closed, through an aperture in the cover 31, an aperture in the guide 34, below the cut-out 35c and under the cup 43. The projecting end of the pin 42 is engageable by shoulders 47 and 47a formed on a rotatable member 48 which is normally held by a spring 49 with the shoulder 47 engaging the pin 42 as shown in Fig. 8. The rotatable member 48 is operable by a handle 50 through the medium of a coin inserted into the recess 50a, the coin being effective to permit operation of the handle 50 in a manner common to a well known type of coin release locks.

Access is normally prevented to all but the upper shelf of the frame 14 by shields 51 which are slidably mounted in guides 52a projecting inwardly from the wall of the casing 10. Each shield is provided with an aperture 53 which, in one position of the shields, registers with the door 22. Springs 55 are provided tending to draw the shields into position to register the apertures with the door 22 but the shields are normally held out of such position by means of spring latches 54 mounted on the casing wall and provided with shoulders which engage the edges of the apertures. In one vertical row of compartments, each compartment except the bottom one is provided in the shelf forming its floor with a pivoted flap 56 fixed to a pintle 57 extending below the shelf through a partition 15a of the next lower shelf and having fixed to its end a depending arm 58. The arm 58 engages a spring pressed bar 59 slidably mounted on the partition 15a and which is adapted, when projected, to engage a latch 54 and disengage it from its associated shield. Normally the bar 59 is held in inoperative position by reason of a bottle resting on the flap 56 and retaining it in the position shown in Fig. 15. When the bottle is removed the flap assumes the position shown in Fig. 16, thereby freeing the bar 59 to permit it to move into position to engage a latch 54.

Figures 4, 5, 6, 7:
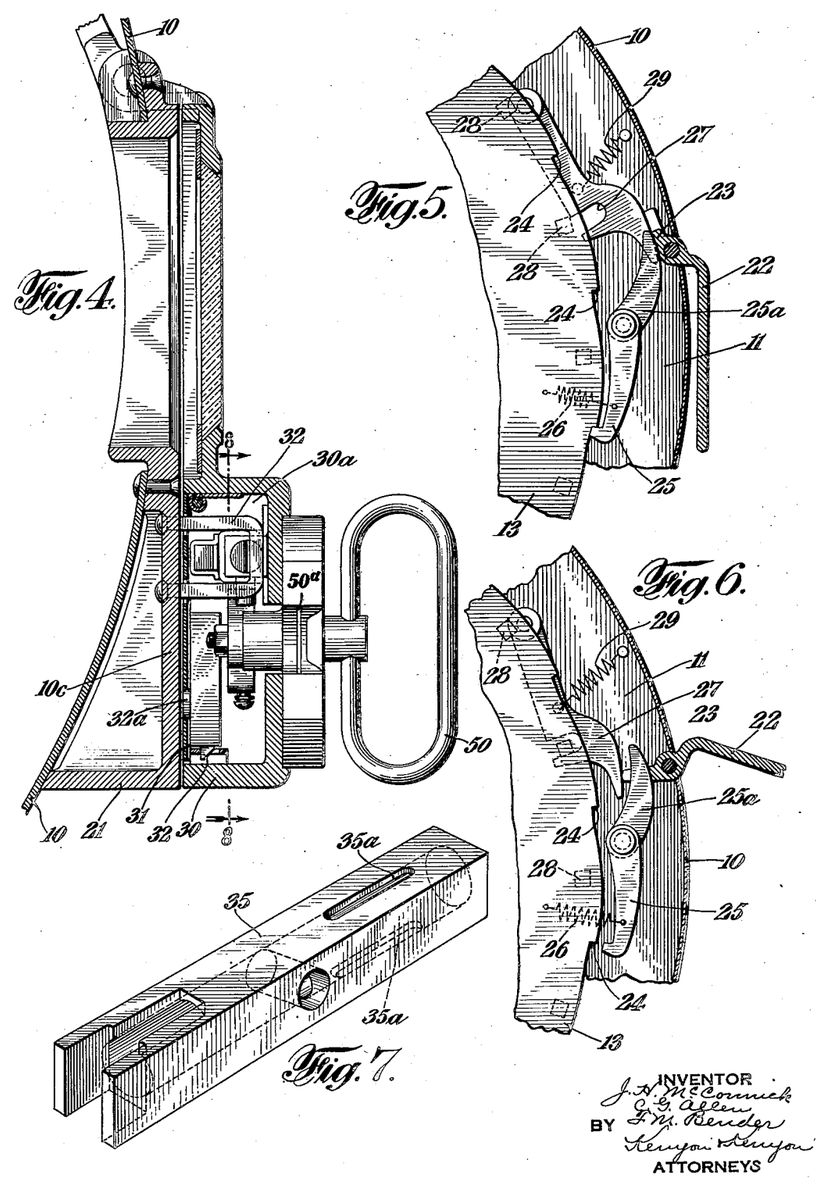
Fig. 4 is an enlarged section on the line 4—4 of Fig. 1.
Figs. 5 and 6 are enlarged sections on the line 5—5 of Fig. 1.
Fig. 7 is a perspective view of one of the parts making up the door control mechanism.
Figure 10:
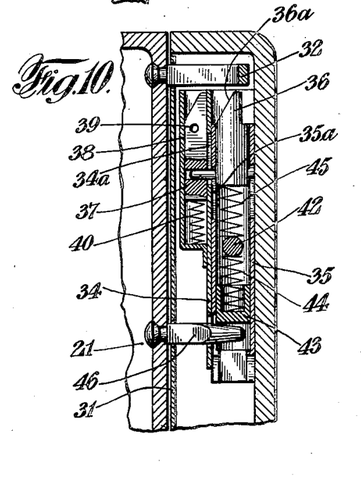
Figures 11, 12:
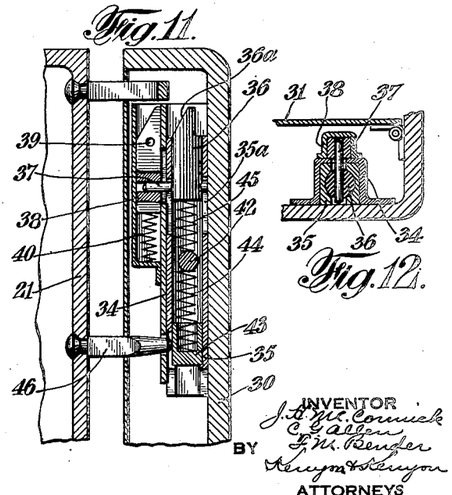
Fig. 12 is a fragmentary section on the line 12—12 of Fig. 9.
Figure 13:
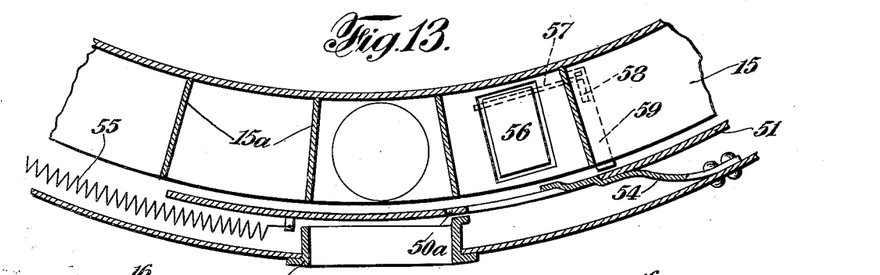
Fig. 13 is an enlarged section taken along line 13—13 of Fig. 1 with the parts disclosed in the position assumed by them after removal of the next to the last bottle on the top shelf.
Figure 14:
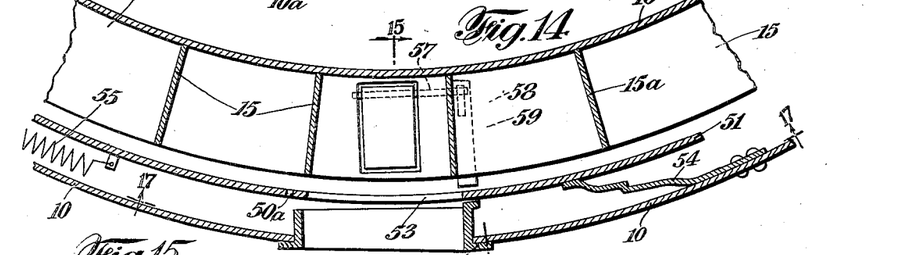
Fig. 14 is a section similar to Fig. 13 with the parts disclosed in the position assumed by them after the removal of the last bottle from the top shelf.
Figure 15:
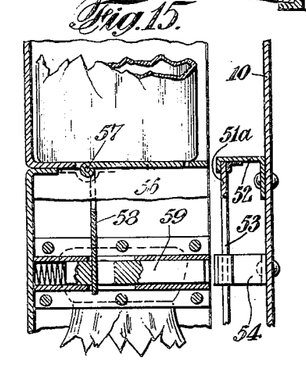
Fig. 15 is a partial section taken substantially on the line 15—15 of Fig. 14 with the parts disclosed in the position assumed by them before removal of the first bottle from the top shelf.
Figure 16:
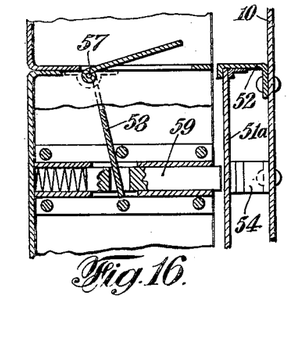
Fig. 16 is a similar section with the parts disclosed in the position assumed by them after the removal of the last bottle from said shelf.
Figure 17:
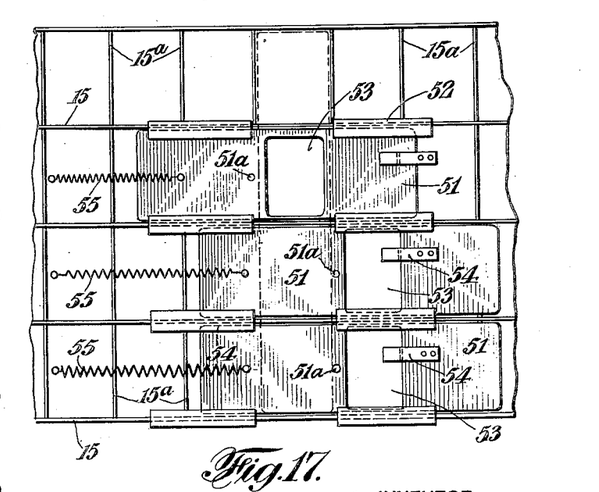
Fig. 17 is a front elevation of the shields, the casing wall being broken away.

The operation of the device as described up to this point is as follows: Assume that the compartments of the various shelves have been filled with bottles and that the compartments equipped with the flaps 56 are in register with the door 22. The shields 51 are held in retracted position by the latches 54 so that only the top compartment will be accessible when the door is opened. The bars 59 are held in retracted position since the flaps 56 are held down by the bottle resting on them (Fig. 15). The weight 21 is in the position shown in Fig. 1 and the escapement mechanism is in the position shown in Fig. 10, while the locking bolts 35 and 39 are in the position shown in Fig. 14. Assume now that a coin is inserted through the slot 50a and the handle 50 is turned to bring the shoulder 47a into engagement with the pin 42. By virtue of such engagement, the slide 35 is pulled downwardly and as the upper end of the slot 35a in the slide engages the pin 41, the bolts 36 and 39 are drawn down out of the way of the hasp so that the door may be opened (Fig. 10). Opening of the door removes the pawl 25 from the shoulder 24 and brings the detent 27 into operative position, thereby permitting slight rotation of the table 13 (Fig. 6). The bottle may now be removed from the top shelf compartment after which the door is closed, either manually or by its spring, the locking bolts being moved downwardly by engagement of their oblique surfaces with the cross member of its hasp 32, thereby rendering the detent 29 inoperative and permitting the plate 13 to advance until the pawl 25 engages the next shoulder 24, thereby bringing a new compartment of the top shelf into register with the door 22. Removal of the bottle from the flap equipped compartment permits the bar 59 to be projected by its spring into position to engage the latch 53 of the shield for the next lower shelf. When the last filled compartment of the top shelf comes into register with the doorway the bar 59 has reached the position shown in Fig. 13. After the last bottle is removed and the frame 14 advances another step, the bar 59 engages the end of the latch 53, thereby disengaging it from the shield 51 and allowing the same to be moved under the influence of its spring 59 to the position shown in Fig. 17, thus making accessible the flap equipped compartment of the second shelf (see also Figs. 14 and 16). The removal of this bottle releases the next lower bar 59 so that when the compartments of the second shelf are emptied the shield for the third shelf is released in the manner above described. This is continued until the bottles have all been removed from their shelves.

The plate 13 is released by the detent 27 just before the door 22 is completely closed and means are provided for preventing advantage being taken of this fact to obtain more than one bottle with a single coin. When the pin 42 is moved downwardly the spring 44 is compressed and presses the plug 43 against the pin 46 (Fig. 10). As the door is opened the plug 43 moves out of contact with the stud 46 and is then pressed downward into the position shown in Fig. 11, its downward movement being limited by the flanges at the bottom of the slide 35. The plug 43 will remain in this position until the pin 42 is returned to normal position by the shoulder 47, and in this position it is impossible to close the door sufficiently to release the detent 27 since the stud 46 will engage the plug 43. In order for the door to close, under such circumstances, sufficiently to disengage the detent 27 it is necessary first to release the handle 50 so that the member 48 may be returned to the position shown in Fig. 8 by the spring 49 whereupon the pin 42 will be returned by the shoulder 47 to the position shown in Fig. 9 and the plug 43 will be returned to the position shown in the same figure.

The bolts 35 and 39 are thereupon projected by their springs into locking position and turning of the handle 50 is prevented since the coin was dropped from the slot 50a when the handle 50 reached the limit of its rotation. Closure of the door sufficiently to render the detent 27 inoperative, places the bolt 39 in engagement with the hasp 32 and prevents reopening of the door unless another coin is inserted in the slot 50a. It is, therefore, impossible to obtain access to a compartment after the frame has been advanced a step except by operating the machine in the normal manner.

When it is desired to fill the frame 14 with bottles the top 10a is removed and the frame rotated by means of the handle 14a to wind up the cable 19 on the drum 18, the door 24 being closed at this time so as to keep the lever 29 in inoperative position. The door 22 is then opened, a coin being used to release the locking mechanism. After the door 24 has been opened, the cover 31 of the chamber 33 is opened and, while the handle is still held in turned position, a pin is passed through a bore 39a in the bolt 39 and apertures 38b in the guide 38, after which the cover 31 is closed and the handle 50 released. As the rotating member 48 returns to normal position the shoulder 47 engages the pin 42 and lifts it back to normal position, thus causing the plug 44 to return to normal position so that the door can be closed. The spring 49 is of sufficient strength to compress the spring 45 to obtain the action above described. The bolts 36 and 39 will be retained in the position shown in Fig. 9. The operator can then open and close the door without using a coin. He then fills the exposed row of compartments and closes the door, thereby permitting the weight 21 to advance the frame and bring a new row into position. The door is again opened and this row is filled and the operation repeated until all the compartments have been filled. The frame is then rotated backward one revolution to take up the cable that has been unwound. The shields are returned to shielding position by use of a suitable tool inserted in the holes 51a and the pin holding the bolt 39 is removed to release the locking bolts after which the door is closed. The machine is then again ready for use.

Figure 18:
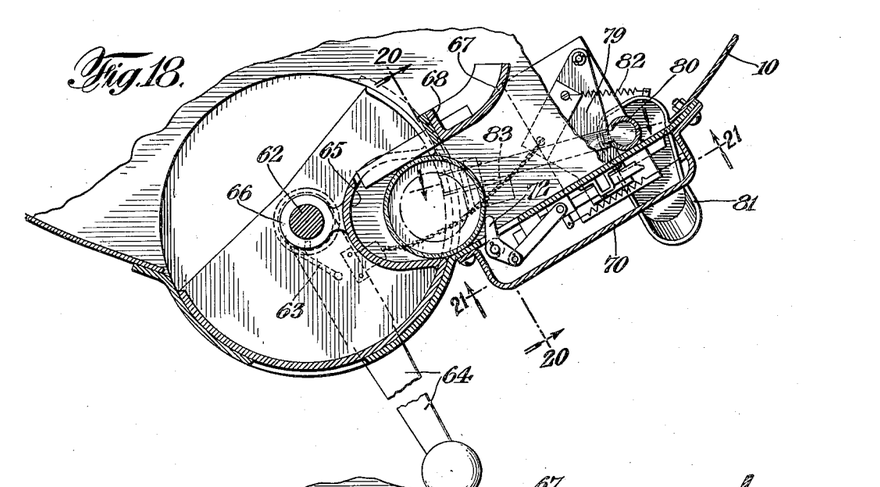
Figures 19, 19A, 20:
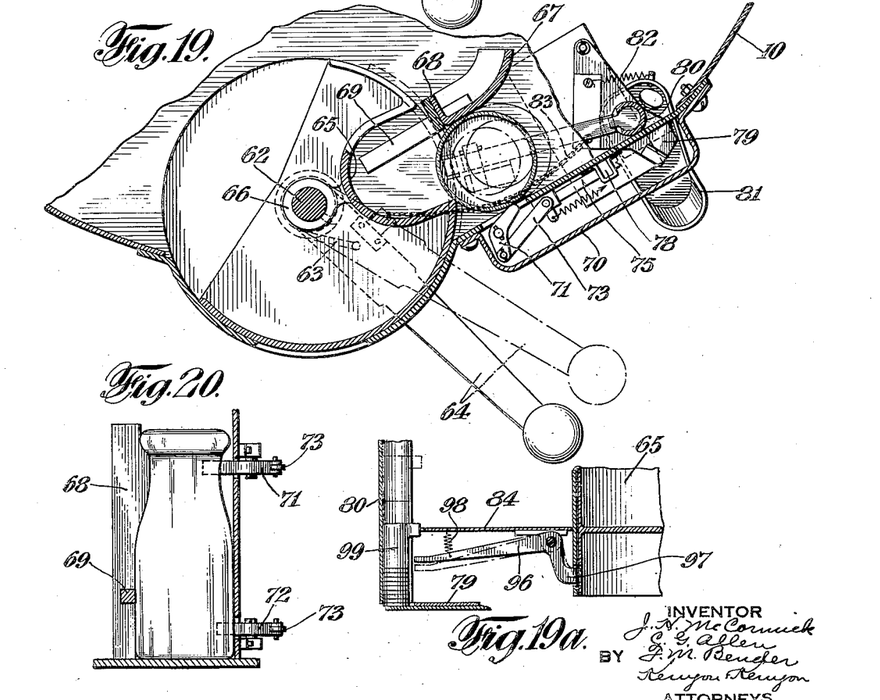
Figure 21:
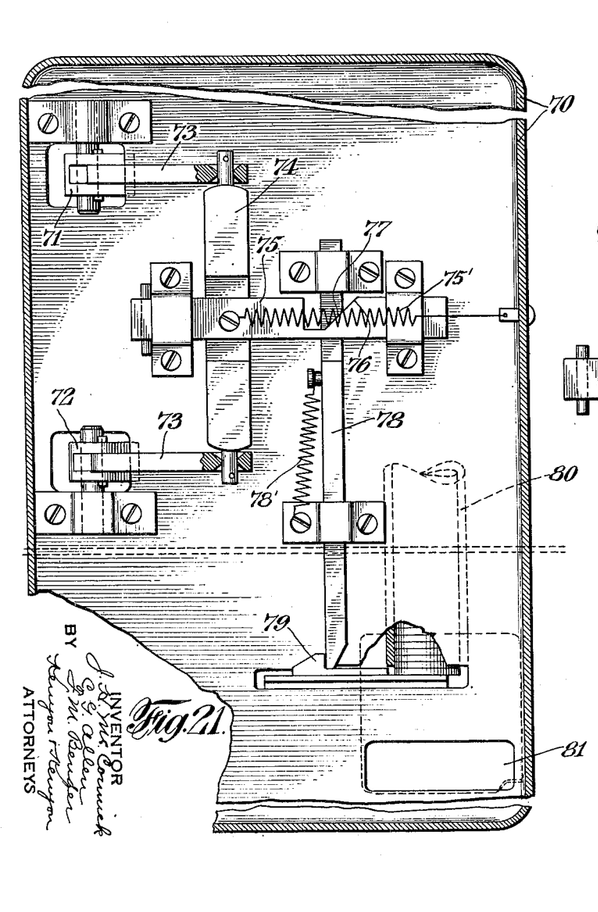
Fig. 21 is a section on the line 21—21 of Fig. 18.
Figures 22, 23:
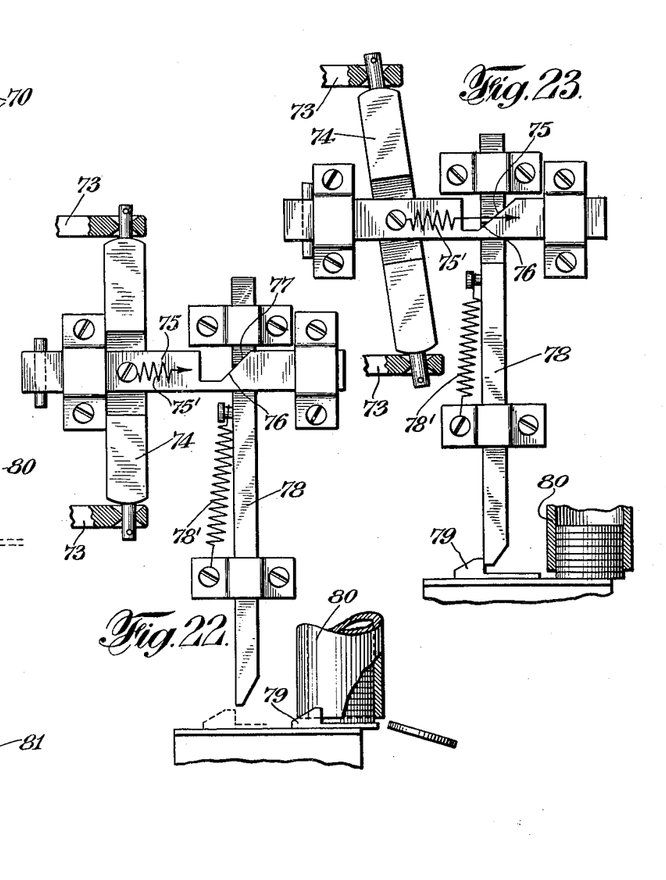
Figs. 22 and 23 are fragmentary views generally similar to Fig. 21 and showing different positions assumed by the various parts.
Figure 24:
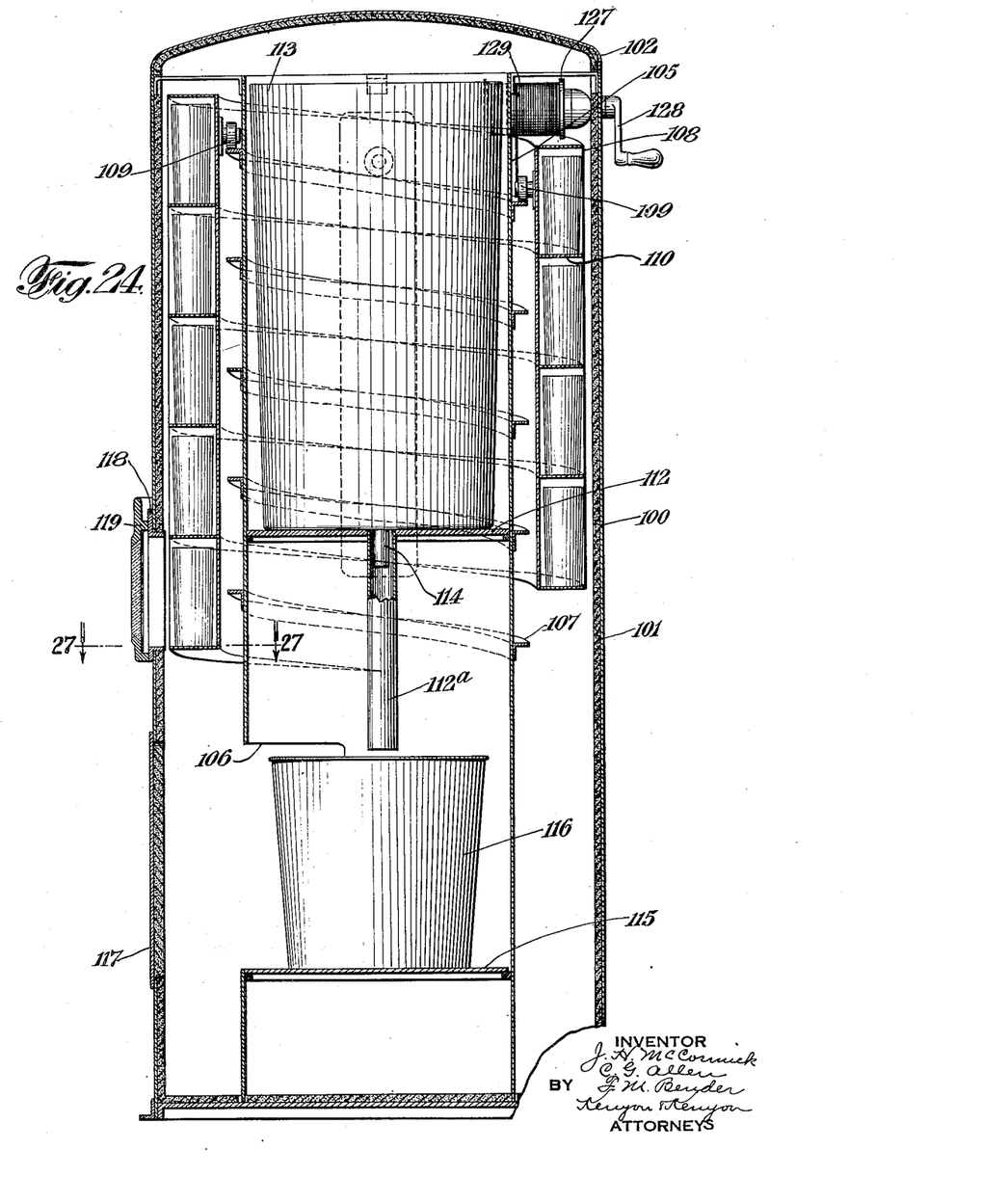
Fig. 24 is a vertical section through a modified form of the machine.
Figures 25, 26, 27, 28:
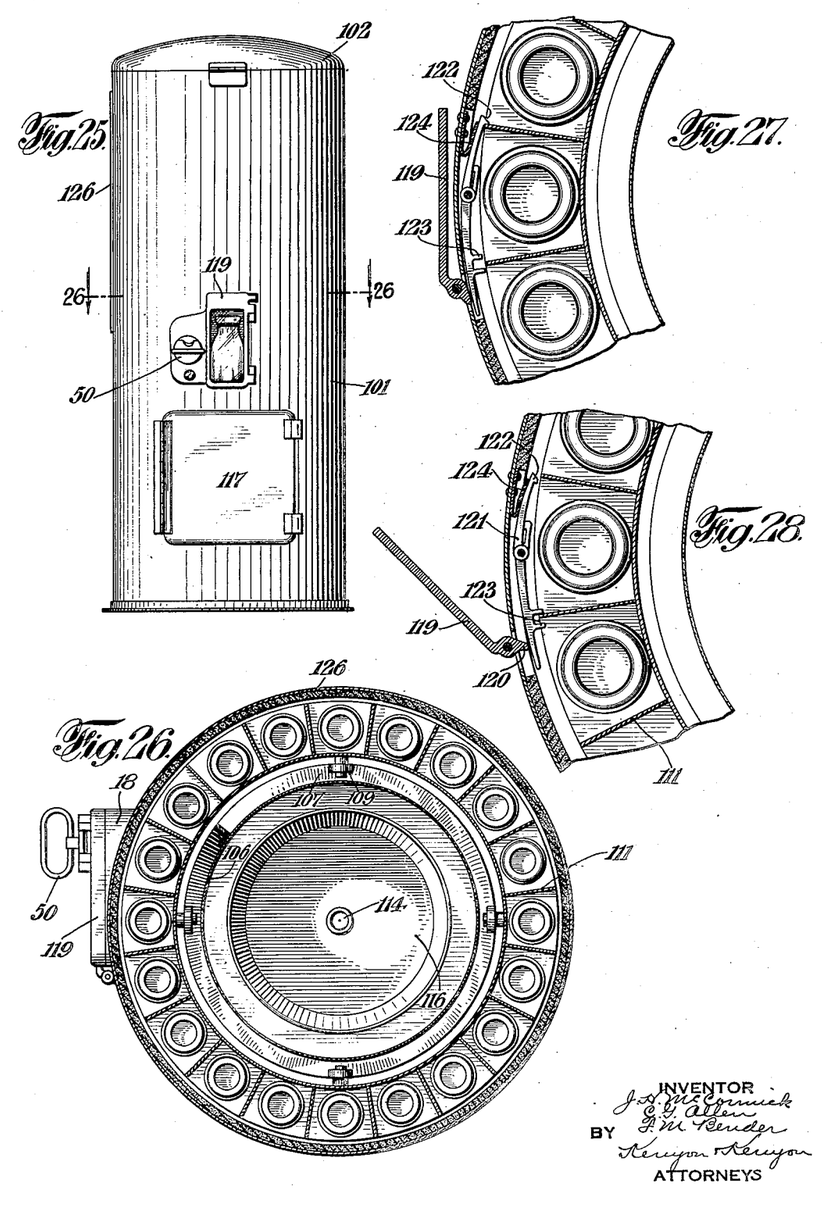
Fig. 25 is a front elevation of the modified form of the machine.
Fig. 26 is a section on the line 26—26 of Fig. 25.
Figs. 27 and 28 are enlarged sections on the line 27—27 of Fig. 24.

A machine designed for vending bottled goods is preferably provided with means for accepting empty bottles and delivering a refund for such bottles. An aperture is provided in the wall of the lower chamber and a cylindrical tray 60 is supported in said aperture with approximately one-third of the tray extending beyond the casing wall (Fig. 1). A cover 61 is arranged at the upper part of the aperture and the ends of a shaft 62 are journalled in the tray and cover. A collar 63 is keyed to the shaft 62 and is provided with a handle 64 which projects through a slot in the lateral wall of the tray 60. A carrier 65 is also keyed to the shaft 62 and rests upon the collar 63. The carrier is formed with a recess 65a to receive the bottle to be redeemed. A helical spring 66 has one end attached to the tray 60 and the other end to the lever 64 and normally tends to hold the bottle carrier in the position shown in Fig. 3. Within the chamber, a bottle passageway is formed between the wall of the casing and a partition 67 at the front end of which is provided a gauge plate 68. An arm 76 projects from the partition plate 67 and is adapted to direct a bottle from the carrier to the chute when the carrier is moved as shown in Figs. 18 and 19, the arm passing through a slot 65a provided in the carrier for that purpose. A housing 70 is connected to the casing 10 and in it are pivotally mounted feelers 71 and 72 which normally project into the chute and which are engaged by a bottle passing through the chute. The ends of the feelers 71 and 72 are connected by links 73 with opposite ends of an arm 74 pivotally mounted on a slide 75. The slide 75 is provided with a cutout portion having an oblique surface 76 which engages a correspondingly oblique surface 77 formed on a detent plunger 78, the lower end of which engages and holds in retracted position a pivoted coin ejector 79. A spring 75' maintains the surface 76 in contact with the surface 77. The ejector 79 is adapted to expel the bottom coin of a pile of coins contained in the tube 80 and discharge the same into a coin return chute 81. The ejector 79 is actuated by a spring 82 and is connected by a chain 83 with the operating lever 64. The bottle passage way discharges onto a shelf 84 having a sloping portion which overlies a receptacle 85 having a sloping bottom 86, the receptacle being supported by the shelf 11a.

Figure 3:
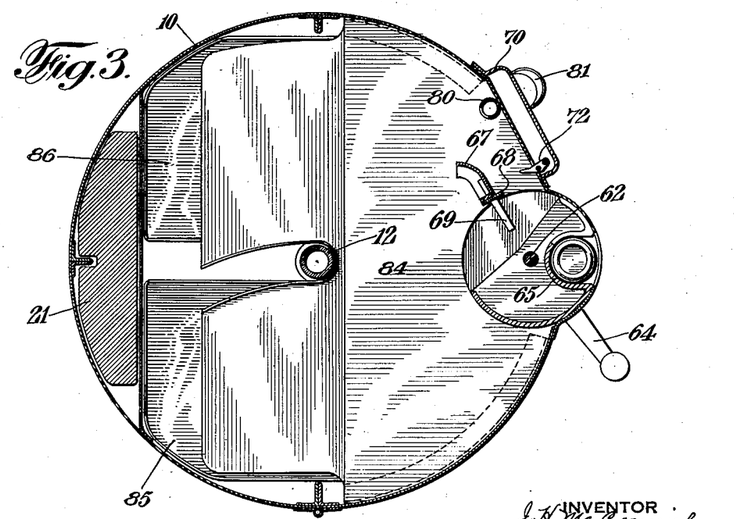
Fig. 3 is a section on the line 3—3 of Fig. 1 with details of structure omitted.

In order to obtain a refund for an empty bottle, the bottle is placed in the carrier 65 which is normally maintained in the position shown in Fig. 3. The operating handle 64 is then swung from the position shown in Fig. 3 to the position shown in full lines in Figs. 18 and 19 and to the position shown in dot and dash lines in Fig. 19. The arm 69 is effective to direct the bottle out of the carrier into the chute where is passes between the gauge plate 68 and the feelers 71 and 72. If the bottle is of the proper size and configuration, both feelers 71 and 72 are actuated, thereby pulling the lever 74 to the left (see Fig. 21) and with it the slide 75. Contact of the oblique surfaces 76 and 77 causes the bar 78 to be lifted to disengage the ejector 79, which under the influence of the spring 82 swings forward to eject the bottom coin of the pile of coins into the coin return chute 81. If the bottle presented is of improper shape or size either the feeler 71 or the feeler 72 will not be operated its full extent. As a result the slide 75 will not be pulled to the left as far as usual with the result that the detent 78 will not be sufficiently lifted to disengage it from the ejector 79, so that there will be no ejection of a coin, (see Fig. 22). On the return of the handle 64 to normal position the ejector 79 will lift the detent 78 against the action of its spring 78' and when the ejector passes beyond the detent 78 it will be returned to latching position by such spring. As soon as the bottle is fully pushed in the feelers return to normal position. Should the carrier not be rotated forwardly sufficiently to push the bottle past the feelers, the return movement of the carrier will cause the bottle to be engaged by the edge of the bottle recess thereby forcing the bottle past the feelers. The redeemed bottles are gradually pushed by succeeding bottles along the shelf 84 until they reach the edge after which they drop into the receptacle 85. The lower compartment is provided with a door 10b through which the empty bottles may be removed or access be had to the compartment.

The coin used to release the locking mechanism is dropped into a chute 90 in which it is held in back of a magnifying glass 91 until the machine is again operated (Fig. 8). The coins with which the machine has been operated are thus temporarily displayed and make it possible for an observer easily to discover whether a slug has been used instead of a coin. A pivoted arm 93 extends into the chute 90 and acts as a stop to locate the coin in front of the glass. This arm is pressed toward a stop pin 93a by a spring 93b. A pivotally mounted lever 94 is provided with a lip 94a which engages a lip 93c provided on the arm 93. A spring 95 tends to hold the lever 94 in the position shown in Fig. 8, while a stud 96 is provided on the rotating member 48 to engage the upper end of the lever 94. The operation of this mechanism is as follows: The coin c which was last used to release the locking mechanism is supported in the chute in front of the magnifying glass by the arm 93. As the member 48 is rotated, the stud 96 engages the upper end of the lever 94 and moves the same slightly. By reason of the engagement of the lips 93c and 94a the arm 93 is moved against the action of the spring 93b sufficient to permit the coin c to drop. The stud 96 moves out of engagement with the upper end of the lever 94 allowing it to be returned to normal position by the spring 95 which permits the spring 93b to return the arm 93 into position to be engaged by the coin by means of which the lock has just been released. As the rotating member 48 is returned to normal position, the stud 96 again trips the lever 94, but this has no effect on the arm 93 as the lips 93c and 94a merely move away from each other and then back into contact.

In the particular machine above described, a dime is required to operate the lock releasing means to permit access to the bottle of milk or the like in the compartment in register with the door. The refund mechanism is designed to pay back to the customer a nickel for the return bottle. The machine may, however, be designed to be operated by and make refund of coins of other denominations than these. The bottles used in the vending mechanism above described may be a standard type of bottle or may be a bottle particularly designed for the machine. A special design of bottle might be desirable as it would effectively prevent improper operation of the refunding mechanism. The character of use to which the machine is to be put will be largely determinative of whether a standard type or a special type bottle will be used. The machine may be adapted with any type bottle simply by proper adjustment of the feelers and the use of a proper gauge plate.

Means are provided to prevent operation of the carrier 65 when the supply of nickels in the coin tube 80 is exhausted. A lever 96 is pivoted to the shelf 84 and is provided with a horn 97 which is adapted to project into an aperture in the bottle carrier 65 to lock the same against rotation. A spring 98 normally holds the lever 96 in inoperative position. A weight 99 is slidably arranged in the coin tube 80 and rests upon the pile of coins therein. This weight is provided with a lug which projects through a slot in the coin tube and when the coins are exhausted engages the end of the lever 96 to swing the same into operative position whereby the horn 97 locks the carrier 65.

Referring now to Figs. 24 to 28 inclusive, the machine comprises a cylindrical metal casing 100 provided with a liner 101 of heat insulating material. The casing is provided with a removed cover 102 provided with a heat insulating liner 103. Within the casing 100 there is provided a cylinder 105 which extends substantially the full length of the casing and which is cut out at 106 for a purpose later to be set forth. A helical track 107 is supported by the cylinder 105 and surrounds the upper portion of such cylinder. A cylindrical frame 108 is arranged in the space between the cylinder 105 and the casing 100 and is supported from the track 107 by rollers 109 carried by the frame. This frame is provided with a helical shelf 110 of the same pitch as the track 107, the shelf being divided into compartments by vertical radial partitions 111. Within the cylinder 105 there is provided a shelf 112 having a conduit 112a leading downwardly therefrom. A tank 113 is arranged within the cylinder 105 and is supported on the shelf 112. This tank may be used to receive ice or any suitable refrigerating apparatus. The tank is provided with a drain pipe 114 which extends into the conduit 112. Near the bottom of the cylinder 105 and even with the bottom of the cutout 106 there is provided a shelf 116 upon which is supported a receptacle 116a into which drippings from the tank 113 are drained. The casing is provided with a door 117 by means of which access may be had to the receptacle 116.

At a point about midway between the top and bottom of the casing there is provided an aperture for permitting access to the compartments of the frame 105, this aperture being of approximately the same height as a compartment. A casting 118 is mounted in the aperture and supports a door 119 which is provided with a projection 120 extending into the casing. This door is provided with locking mechanism which is identical with that with which the door 22 of the modification disclosed in Figs. 1 to 23 is equipped. An escapement mechanism substantially similar to that used in the first modification is provided in this modification. A pawl 121 is provided with a shoulder which is adapted to engage the edge of a partition 111 to prevent rotation of the frame 108, the pawl normally being held in operative position by a spring 122. A pivoted detent 123 is provided with a socket for receiving the edge of a partition 111. A spring 124 tends to maintain the detent 123 in inoperative position. The door 119 is provided with a projection 125 which engages both the pawl 121 and the detent 123 to move them against the action of their respective springs.

As the frame 108 is supported by the rollers 109 on the helical track 107, it tends to rotate and move downwardly under the influence of gravity. Such action by the frame is normally retained by the pawl 121 due to the fact that when the door 119 is closed the pawl is projected into operative position by the spring 122. When the door 119 is opened, the pawl 121 is operated by the projection 125 to disengage it from the partition. Before the pawl is disengaged from a partition, the detent 123 is operated by the projection 125 to bring the front wall of its recess slightly ahead of a partition 111. When the pawl 121 releases its partition 111, the frame 106 rotates until the front wall of the socket in the detent 123 is engaged by a partition. This rotation is sufficient to prevent re-engagement of the pawl 121 with the partition with which it was engaged when the door is again closed. After the contents of the compartment in register with the door have been removed and as the door is being closed, the spring 122 actuates the pawl 121 to move it into position to engage the next partition. The detent 123 is moved to its inoperative position by its spring 124 thereby permitting rotation of the frame 108 to the extent of a single compartment. The detent 123 is not moved to its inoperative position until the door 119 has been closed sufficiently to be locked by the bolt 34 described in connection with the first modification. As the pitch of the helical shelf 110 is substantially the same as that of the helical track 107, each compartment becomes successively accessible through the door 119.

The casing is provided with an elongated door 126 through which merchandise may be introduced to fill the various compartments. In the upper part of the casing there is provided a drum 127 which is operable by the removable handle 128. A cable 129 has one end fixed to the drum and the other end to the frame 108. As the frame 108 rotates and moves downwardly the cable is unwound from the drum and is wound around the cylinder 105, the cable sliding on the cylinder wall or on rollers provided for that purpose. After the compartments have been emptied and when the door 119 closes the cable is wound up, thus returning the frame to the position shown in Fig. 24. Reverse rotation of the frame is permitted by the escapement mechanism as the detent 123 is held in its inoperative position and the pawl 121 is moved out of the way upon engagement of the edge of the partitions with the oblique surfaces of which the pawl is provided. After the frame has been brought back to the position shown in Fig. 24, the door 119 is opened and the locking bolts fixed as described in connection with the filling of the modification disclosed in Fig. 1, and one vertical row of compartments is filled with merchandise through the door 126. The door 119 is then operated to bring the other vertical row successively into register with the door 126 to permit filling all of the compartments. The locking bolts of the door 119 are then released so that the machine is ready for normal operation. The drum 127 is again operated to pick up the cable which is unwound during the filling operation.

Either of the above described machines may be used for vending different articles of merchandise, but both are designed primarily for the vending of milk, soft drinks and the like. In either of the two modifications bottles or paper containers may be made use of, although the first modification is designed primarly for bottles, while the second modification is designed primarily for paper containers. Where bottles are used it is desirable to provide a refunding mechanism although the use of such mechanism is not essential. However, where paper containers are used with the machine there is no need for any redeeming mechanism.

It is, of course, understood that various structural modifications may be made in the machines above disclosed without in any way departing from the spirit of the invention as defined in the appended claims.

We claim:

1. A vending machine comprising a casing, a frame rotatably mounted in said casing, said frame being provided with a plurality of superposed rows of peripheral merchandise compartments, a door in said casing of substantially the same height as said frame, means controlled by the opening and closing of said door for effecting step by step rotation of said frame to bring vertical rows of compartments successively into register with said door, shields normally preventing access to the compartments of all but one horizontal row of compartments, and means for rendering each shield inoperative upon removal of the merchandise from a row of compartments offset from said shield.

2. A vending machine comprising a casing, a rotatable frame mounted in said casing, said frame being provided with a plurality of superposed rows of peripheral compartments, a door in said casing of substantially the same height as said frame, means controlled by the opening and closing of said door for effecting step by step rotation of the frame to bring successive vertical rows of compartments into register with said door, movable shields for preventing access to the compartments of all but one horizontal row, and means carried by said frame for effecting release of said shields, said last named means being rendered inoperative by articles of merchandise in certain of the compartments.

3. A vending machine comprising a casing, a rotatable frame mounted in said casing, said frame being provided with a plurality of horizontal rows of peripheral compartments, a door in said casing of substantially the same height as the frame, means controlled by the opening and closing of said door for effecting step by step rotation of the frame to bring the successive vertical rows of compartments into register with said door, shields individual to certain horizontal rows of compartments for preventing access thereto, and means individual to certain horizontal rows of compartments to effect release of said shields, said releasing means being rendered inoperative by articles of merchandise in certain compartments.

4. A vending machine comprising a casing, a rotatable frame within said casing, said frame being provided with super-posed rows of peripheral compartments, a door in said casing of substantially the same height as said frame, means controlled by the opening and closing of said door for effecting step by step rotation of said frame to bring vertical rows of compartments successively into register with the door, and means for progressively rendering the horizontal rows accessible upon opening of the door.

5. A vending machine comprising a casing, a rotatable frame in said casing, said frame being provided with a plurality of super-posed rows of peripheral compartments, a door in said casing of substantially the same height as said frame, means for effecting step by step rotation of the frame upon opening and closing of the door to bring vertical rows of compartments successively into register with said door, said means being effective to prevent substantial rotation of said frame except upon virtual closure of said door, and means for progressively rendering horizontal rows of compartments accessible upon opening of the door.

6. In a vending machine comprising a casing, a rotatable frame in said casing, said frame being provided with a plurality of super-posed rows of peripheral compartments, means tending to rotate said frame, escapement means for effecting step by step rotation of said frame, a door in said casing, said door having provision for controlling the operation of said escapement means, and means for progressively rendering the horizontal rows accessible through said door.

7. A vending machine comprising a casing having a doorway, a door therefor, a rotatable frame mounted in said casing and being provided with a plurality of peripheral compartments, said frame being subject to a force tending to rotate the same, a pair of pawls, stops on said frame engageable by said pawls to prevent rotation thereof, resilient means normally maintaining one pawl in operative and the other pawl in inoperative position, and means on said door engageable with said pawls to move the same simultaneously out of normal position.

8. A vending machine comprising a casing having a doorway, a door therefor, a rotatable frame mounted in said casing and being provided with a plurality of peripheral compartments, said frame being subject to a force tending to rotate the same, a pair of pawls, stops on said frame engageable by said pawls to prevent rotation thereof, resilient means normally maintaining one pawl in operative and the other pawl in inoperative position, and means on said door engageable with said pawls to move the same simultaneously out of normal position, said means being effective to maintain said pawls out of normal position until virtual closure of said door.

9. A vending machine comprising a casing having a doorway, a door therefor, a rotatable frame mounted in said casing and being provided with a plurality of peripheral compartments, means tending to rotate said frame, a pair of detents for preventing rotation of said frame, resilient means normally maintaining one detent in operative and the other detent in inoperative position, and means on said door engageable with said detents to move the same simultaneously out of normal position.

10. A vending machine comprising a casing having a doorway, a door therefor, a frame rotatably mounted in said casing, said frame being provided with a plurality of superposed rows of peripheral compartments, means controlled by the opening and closing of said door for effecting step by step rotation of said frame to prevent vertical rows of compartments successively into register with said door, shields for all but one of the horizontal rows of compartments, means tending to draw said shields into operative position, detents for holding said shields in operative position, detent trippers carried by said frame, means to project said trippers into operative position, and means in one compartment of each of certain rows thereof for rendering said projecting means inoperative, said last named means being controlled by articles of merchandise in said compartments.

11. A vending machine comprising a casing having a doorway, a door therefore, a frame rotatably mounted in said casing, said frame being provided with a plurality of superposed rows of peripheral compartments, means controlled by the opening and closing of said door for effecting step by step rotation of said frame to prevent vertical rows of compartments successively into register with said door, shields for all but one of the horizontal rows of compartments, means tending to draw said shields into inoperative position, detents for holding said shields in operative position, detent trippers carried by said frame, and means for rendering said trippers inoperative, said last named means being controlled by articles of merchandise.

12. A vending machine comprising a casing having a doorway, a door therefor, a frame rotatably mounted in said casing, said frame being provided with a plurality of superposed rows of peripheral compartments, means tending to rotate said frame, a pair of pivoted pawls adapted to engage said frame to prevent rotation thereof, resilient means normally maintaining one of said pawls in operative position and the other of said pawls in inoperative position, means on said door engageable with said pawls to move the same simultaneously out of normal position, shields for all but one of the horizontal rows of compartments, means tending to draw said shields into inoperative position, detents for holding said shields in operative position, detent trippers carried by said frame, and means controlled by articles of merchandise for rendering said trippers inoperative.

In testimony whereof, we have signed our names to this specification.

JOHN H. McCORMICK.
CARL G. ALLEN.
FRANK M. BENDER.